US008037467B2

(12) United States Patent
Bandaram et al.

(10) Patent No.: US 8,037,467 B2
(45) Date of Patent: Oct. 11, 2011

(54) SINGLE STREAM PROCESSING WITH MULTI-VERSION SUPPORT OF APPLICATION OPERATING ENVIRONMENTS

(75) Inventors: Satheesh Bandaram, Fremont, CA (US); Sherry Guo, Fremont, CA (US); Bilung Lee, Fremont, CA (US); Paul Ostler, Boise, ID (US)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 11/925,305

(22) Filed: Oct. 26, 2007

(65) Prior Publication Data

US 2009/0113406 A1 Apr. 30, 2009

(51) Int. Cl.
*G06F 9/45* (2006.01)
(52) U.S. Cl. ...................................... 717/166
(58) Field of Classification Search .................. 717/166
See application file for complete search history.

(56) References Cited

U.S. PATENT DOCUMENTS

| | | | |
|---|---|---|---|
| 6,366,898 B2* | 4/2002 | Taivalsaari et al. | 1/1 |
| 6,411,956 B1 | 6/2002 | Ng | |
| 6,415,435 B1* | 7/2002 | McIntyre | 717/108 |
| 6,654,954 B1 | 11/2003 | Hicks | |
| 7,076,765 B1 | 7/2006 | Omori | |
| 7,703,089 B2* | 4/2010 | Birenheide | 717/166 |
| 2007/0198475 A1* | 8/2007 | Meduri et al. | 707/3 |
| 2008/0059949 A1* | 3/2008 | Matic | 717/108 |

OTHER PUBLICATIONS

Cheng Xuex-Ian et al., Theory and Realization of Type 3 JDBC Driver, Wuhan Li Gong Da Xue Xue Bao, Dec. 2004, pp. 880-882, vol. 28, Issue 6.
The Ascendancy of Java Data Access, Aug. 1999, vol. 4, Issue 8, WEB Techniques Solutions for Internet and Web Developers, San Francisco, CA.
Yang, A., et al., "Developing Integrated Web and Database Applications Using JAVA Applets and JDBC Drivers," SIGSCE Bulletin, vol. 30, No. 1, pp. 302-306, Feb.-Mar. 1998.
Xia, Q., et al., "Supporting Web-Based Database Application Development," Proceedings of the 6th International Conference on Advanced Systems for Advanced Applications, Apr. 1999, pp. 17-24.

* cited by examiner

*Primary Examiner* — Philip Wang
(74) *Attorney, Agent, or Firm* — Jose Gutman; Fleit Gibbons Gutman Bongini & Bianco PL

(57) ABSTRACT

A method is provided for developing a software module including support for multiple versions of an operating environment. The method includes determining a first set of references associated with a first version of an application operating environment. A second set of references associate with a second version of the computing environment is determined. A first class loader is associated with the first version of the computing environment. A second class loader is associated with the second version of the computing environment. The method also includes encapsulating the first set of references, the second set of references, the first class loader, and the second class loader in a software module, wherein the second set of references are obscured from the first class loader.

17 Claims, 4 Drawing Sheets

SINGLE STREAM PROCESSING WITH MULTI-VERSION SUPPORT OF APPLICATION OPERATING ENVIRONMENTS

FIELD OF THE INVENTION

The present invention generally relates to the field of application operating environments, and more particularly relates to providing single stream processing of an application/tool with multi-version support of application operating environments.

BACKGROUND OF THE INVENTION

Java technology is both a high-level, object-oriented programming language and a platform. As with most technologies, newer versions of the Java platform are periodically released. Ideally software vendors try to develop applications or tools that require the lowest level of Java as possible to ensure that a broad range of customers can use their products. However, one problem experienced by software vendors who develop applications is that applications developed for an earlier version of Java are not generally compatible with new versions of Java. The following is an example of this problem discussed with respect to a Java Database Connectivity ("JDBC") driver.

A certain minimum level of Java Runtime Environment ("JRE") is always required for a specific version of Java Database Connectivity ("JDBC") specification. For example, the prerequisite level for JDBC 2 is JRE 1.2, for JDBC 3 is JRE 1.4, and for the latest JDBC 4 is JRE 6.0. In order to support a specific version of JDBC specification, a seemingly straightforward solution is to always require a database driver to run with the prerequisite level of Java system. For example, Microsoft's SQL Server 2005 JDBC Driver is JDBC 3 compliant and runs on the JRE 1.4 and later versions. In addition to standard JDBC functionalities, a number of database drivers also include vendor-specific features, most of which do not depend on the underlying level of Java system. Moreover, from the customers' perspective, many of them do not like to move to a new level of Java system too fast for stability reason. Furthermore, vendors who develop applications based on database drivers also prefer a low prerequisite level of Java system for easy adoptability of their products. However, the previous solution forces the minimum level of Java system for the database driver to be the same as that for the highest supported JDBC specification.

Many database driver vendors thus adopt an alternative solution, which spins off a new stream for support of each JDBC specification with a different prerequisite level of Java system. For example, Sybase provides a stream "conn2.jar" for JDBC 2 support on JRE 1.2 and a stream "conn3.jar" for JDBC 3 support on JRE 1.4. Oracle provides a stream "classes12.zip" for JDBC 2 support on JRE 1.2 and a stream "ojdbc14.jar" for JDBC 3 support on JRE 1.4. However, one of the major drawbacks for this solution is that code is duplicated all over the place among separate streams. Besides, each additional stream means additional development, service, and testing effort. This is why some database driver vendors use a third solution, which splits new classes for new JDBC support to avoid dual stream process.

The classes are compiled under different prerequisite levels of Java systems and then bundled together at the end. For example, Cloudscape has a set of major classes for JDBC 3 and another set of major classes for JDBC 4. JDBC 3 specific classes are compiled using JRE 1.4, and JDBC 4 specific classes are compiled using JRE 6.0. At the end, all of these classes are bundled in one Java Archive (JAR) file. However, the JAR file with byte-code compiled under different Java systems is still inadequate and insufficient under certain circumstances. This mixed byte-code solution is not compatible under an IDE, such as Eclipse, because of the multiple Java system build requirement. In addition, it may work for support of one connectivity type with a single inheritance hierarchy, but it does not fit well for support of multiple connectivity types, which most major database vendors have, due to the fact that Java system does not support multiple inheritance hierarchy.

Therefore a need exists to overcome the problems with the prior art as discussed above.

SUMMARY OF THE INVENTION

Briefly, in accordance with the present invention, disclosed is a method for developing a software module comprising support for multiple versions of an operating environment. The method includes determining a first set of references associated with a first version of an application operating environment. A second set of references associate with a second version of the computing environment is determined. A first class loader is associated with the first version of the computing environment. A second class loader is associated with the second version of the computing environment. Encapsulating the first set of references, the second set of references, the first class loader and the second class loader in a software module, wherein the second set of references are obscured from the first class loader.

In another embodiment, a method of providing multi-version operating environment support for a software module is disclosed. The method includes determining a current version of an application operating environment. The method also includes determining that a software module to be executed within the application operating environment is executable under at least a first and second versions of the application operating environment. A set of references is selected from a plurality of references associated with the at least first and second versions of the application operating environment. The set of references are associated with the current version of the application operating environment. Executing the software module in the current version of the operating environment through a single code path associated with the at least first and second versions of the application operating environment in response to the selecting.

In yet another embodiment, an information processing system for providing multi-version operating environment support for a software module is disclosed. The information processing system includes a memory and a processor that is communicatively coupled to the memory. The information processing system also includes an application operating environment for executing an application. The application operating environment includes at least a version coordination manager. The version coordination manager is adapted to determining a current version of an application operating environment. The method also includes determining that a software module to be executed within the application operating environment is executable under at least a first and second versions of the application operating environment. A set of references is selected from a plurality of references associated with the at least first and second versions of the application operating environment. The set of references are associated with the current version of the application operating environment. Executing the software module in the current version of the operating environment through a single code path associated with the at least first and second versions of the application operating environment in response to the selecting.

One advantage of the present invention is a software module such as a Java Archive ("JAR") file can include references to an up-level application operating environment such as JRE. These references are provided within the software module so that they are hidden to a down-level class loader. The techniques of one embodiment of the present invention make possible a single stream process for a tool such as a database driver or an application to support non-standard features at a down-level application operating environment while supporting standard functionalities at the prerequisite level (version) of the application operating environment.

Another advantage is that one embodiment of the present invention does not require the minimum level of the application operating environment for the tool or application to be the same as that for the highest supported application operating environment specification. This can facilitate adoption of the tool or application for customers and other application vendors. In addition, one embodiment of the present invention not only avoids dual stream process with duplicate code and duplicate effort but also avoids mixed byte-code software files (which is still inadequate and insufficient under certain circumstances).

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Example of a Computing Environment

Figure 1:
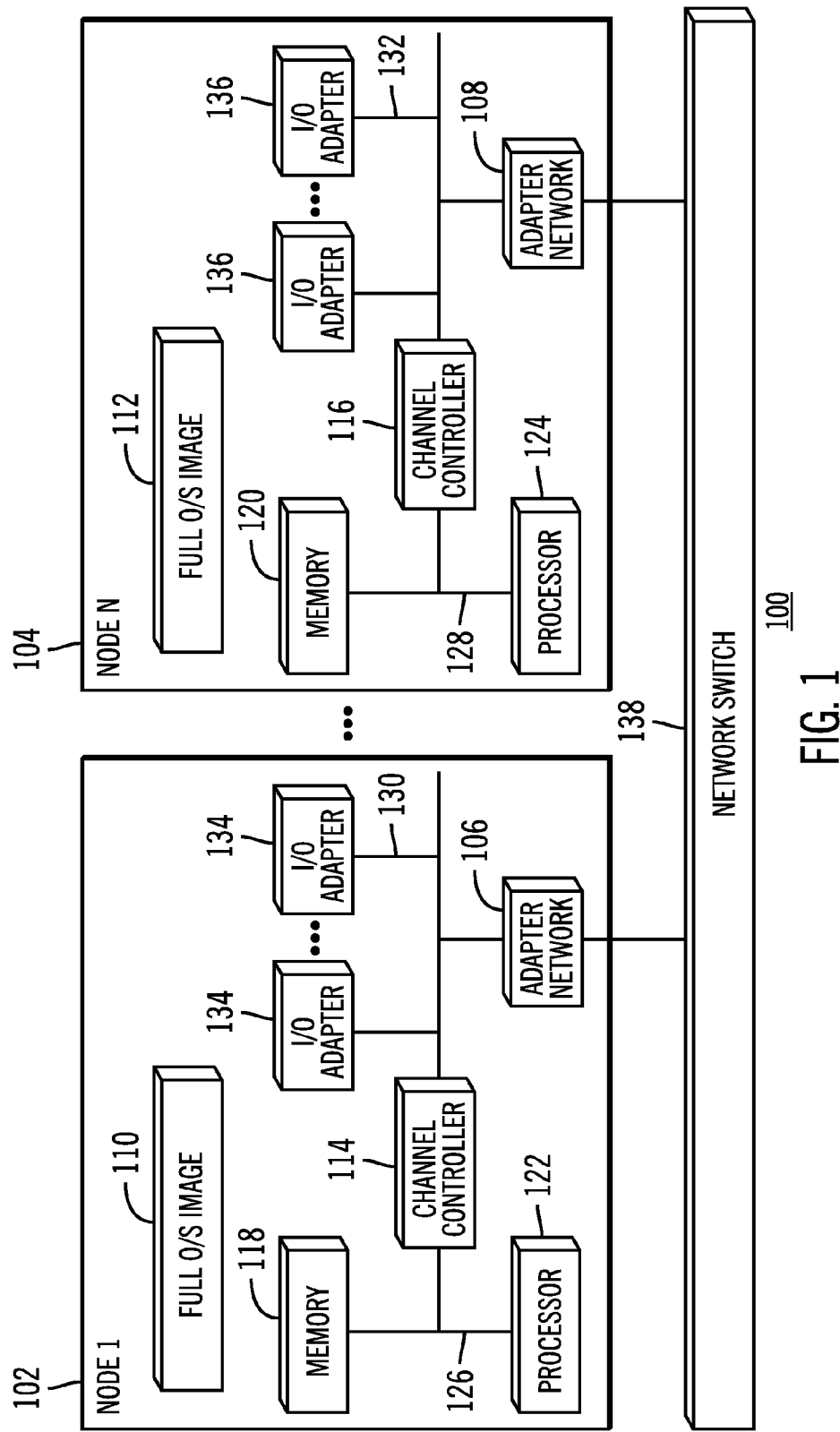
FIG. 1 is a block diagram illustrating an example of a computing environment, according to an embodiment of the present invention.

FIG. 1 is a block diagram illustrating an example of a computing environment according to an embodiment of the present invention. It should be noted that the present invention can be scaled across multiple processing nodes such as in the computing environment of FIG. 1 or can reside at a single node.

In the illustrated embodiment, the computing environment 100 is a distributed system in a symmetric multiprocessing ("SMP") computing environment. The computing environment 100 includes processing nodes 102, 104 coupled to one another via network adapters 106 and 108. Each processing node 102, 104 is an independent computer with its own operating system image 110, 112; channel controller 114,116; memory 118,120; and processor(s) 122, 124 on a system memory bus 126, 128. A system input/output bus 130, 132 couples I/O adapters 134,136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are part of a processing cluster.

Single Stream Process with Multi-Version Support of Application Operating Environments It should be noted that throughout the following discussion the Java system and the Java Runtime Environment ("JRE") are used as one example of an Application Operating Environment ("AOE") applicable to the present invention. Any cross-platform AOE that is system/operating system independent is applicable to the present invention.

Java technology is both a high-level, object-oriented programming language and a platform. Java technology is based on the concept of a single Java Virtual Machine ("JVM"), which is a translator between the language and the underlying software and hardware. All implementations of the programming language must emulate the JVM, enabling Java programs to run on any system that has a version of the JVM. The Java programming language is unusual because Java programs are both compiled (translated into an intermediate language called Java bytecode) and interpreted (bytecode parsed and run by the JVM). Compilation occurs once, and interpretation happens each time the program runs. Compiled bytecode is a form of optimized machine code for the JVM; the interpreter is an implementation of the JVM.

The Java platform is a software-only platform that runs on top of various hardware-based platforms. The Java platform comprises of the JVM and the Java Application Programming Interface ("API"), a large collection of ready-made software components (classes) that ease the development and deployment of applets and applications, including robust, secure, and interoperable enterprise applications. It spans everything from basic objects to networking and security and XML generation and Web services. The Java API is grouped into libraries of related classes and interfaces; the libraries are known as packages.

As discussed above, in one embodiment of the present invention, the code base of a software module 202 (FIG. 2) includes references such as, but not limited to, classes and methods associated with an up-level AOE in a way in which the code base remains compilable and runnable under a down-level AOE. For example, a software module 202 can be a Java Archive ("JAR") file comprising a Java Database Connectivity ("JDBC") driver. To support the JDBC 4 specification, the database driver needs to include references to JDBC 4 classes of JRE 6.0 (an up-level AOE). In one embodiment of the present invention, the database driver remains compilable under JRE 5.0 (a down-level AOE) and, most importantly, runnable under JRE 5.0. As a result, the database driver can run under JRE 5.0 for non-JDBC 4 features. At the mean time, the database driver runs under JRE 6.0 for standard JDBC 4 functionalities (and obviously non-JDBC 4 features).

In one embodiment, a version switch module 214 (FIG. 2), class split module 216 (FIG. 2), instantiation delegation module 220 (FIG. 2), and upcast return module 218 (FIG. 2) can be used alone and/or in combination with one another to provide a single code path that the software module 202 can execute through across multiple versions of the AOE. These modules, in one embodiment, are included within a software development environment/tool 324 (FIG. 3) for enabling the software module 202 to include references to an up-level AOE in a way in which the code base remains compilable and runnable under a down-level AOE. In another embodiment, these modules 214, 216, 218, 220 can be self sustaining modules that reside within the software module 202 for dynamically adjusting the execution of the software module 202 for compatibility across multiple versions of the AOE.

Figure 2:
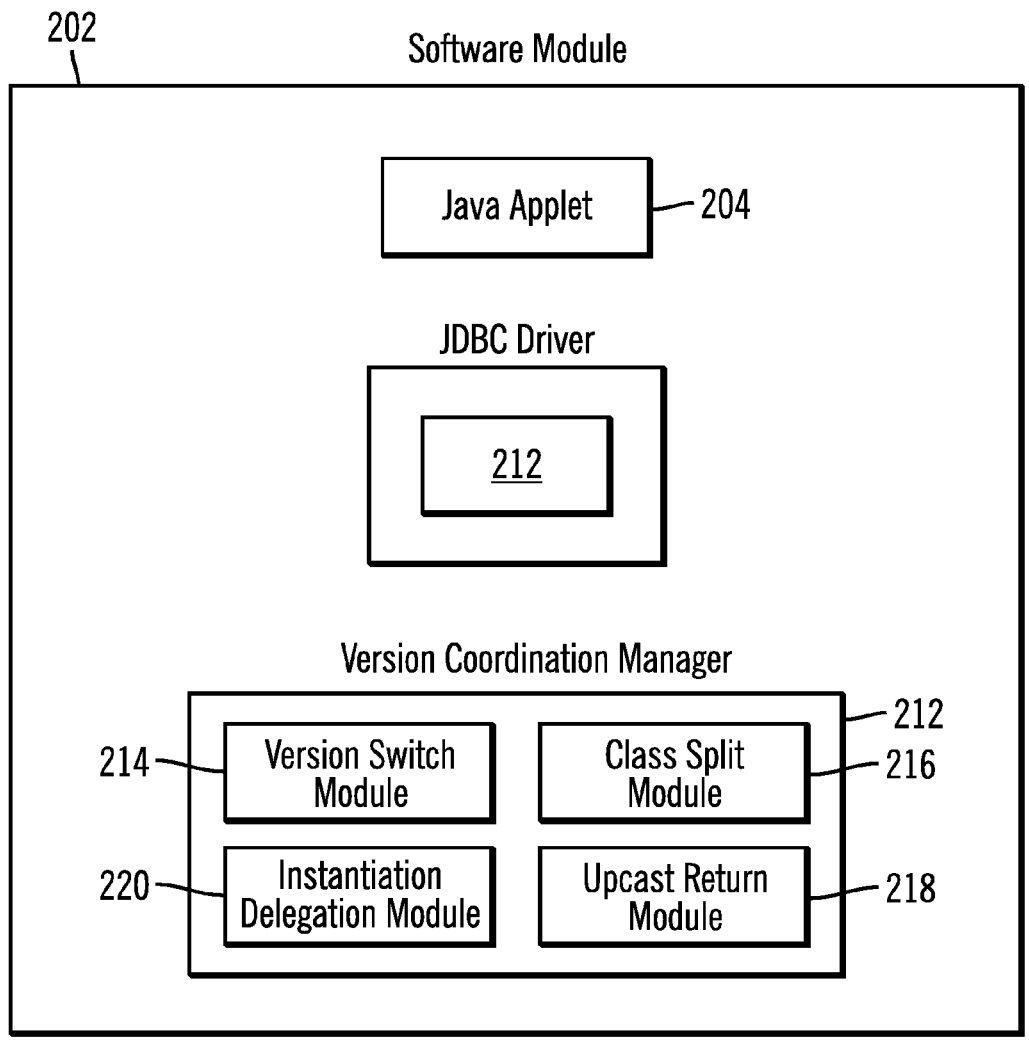
FIG. 2 is a block diagram illustrating an example of a software module according to an embodiment of the present invention.

FIG. 2 shows an example of a software module 202. In particular, FIG. 2 shows a JAR file comprising a Java Applet 204, a JDBC Driver 206, and JRE version X classes 208 and JRE version X-n classes 210. The software module 202 also comprises a version coordination manager 212 comprising the version switch module 214, class split module, 216, instantiation delegation module 220, and upcast return module 218. In one embodiment, the version coordination manager 212 resides within the JDBC driver 206. In an alternate embodiment, the version coordination manager 212 resides outside of the JDBC driver 206. Although the JDBC driver 206, in one embodiment, is shown within the software module 202, once the JDBC driver 206 is installed it becomes part of the application operating environment. The version coordination manager 212, in one embodiment, manages the execution of the software module 202 across the multiple versions of an AOE and determines when each of the version switch module 214, class split module, 216, instantiation delegation module 220, and upcast return module 218 is to be invoked. The functions of each of these modules 214, 216, 218, 220 are discussed in greater detail below.

Using JRE 5.0 as an example of a down-level AOE and JRE 6.0 as an example of an up-level AOE, a database driver can be developed to be compiled under JRE 5.0 as long as new classes in JRE 6.0 are included in the compilation class path and the necessary abstract methods are implemented in subclasses. However, making the database driver runnable under JRE 5.0 while access to JDBC 4 classes of JRE 6.0 is included in the database driver can be a difficult task. The first challenge is that direct references to JDBC 4 classes are not allowed in any code path invoked under JRE 5.0. For example, the following code does not work because the invocation of setObject under JRE 5.0 comes across java.sql.SQLXML.

```
public class PreparedStatement
{
  public void setObject (int parameterIndex, Object x)
  {
    if (x instanceof java.sql.SQLXML)
      setSQLXML (parameterIndex, (java.sql.SQLXML) x);
  }
}
```

Therefore, the version switch module 214 of the present invention can be implemented to divert the code path to access the appropriate class based on the running version of JRE. In the current example, the version switch module 214, when utilized can generate the following code.

```
public class PreparedStatement
{
  public void setObject (int parameterIndex, Object x)
  {
    if (!runningJRE6__) {
      if (x instanceof ProprietaryXml)
        setProprietaryXml (parameterIndex, (ProprietaryXml) x);
    }
    else {
      if (x instanceof java.sql.SQLXML)
        setSQLXML (parameterIndex, (java.sql.SQLXML) x);
    }
  }
}
```

As can be seen in the above example, the above code first checks the running JRE version. If JRE 6.0 is not running, a direct reference to JRE 6.0 classes (i.e., java.sql.SQLXML) is not made. Also, if JRE 6.0 is not running, the code checks if the parameter passed in (Object x) is an instance of a proprietary class, ProprietaryXML. IF this is true the corresponding method is invoked. Otherwise, if JRE 6.0 is running, the code checks if the parameter passed in (Object x) is an instance of the new JDBC 4 class java.sql.SQLXML and invokes the corresponding method.

However, for the same reason that direct references to JDBC 4 classes are not allowed, a proprietary class, which is an extension to one or more standard APIs provide by vendors to access vendor specific features, that is previously supported and now standardized in JDBC 4 cannot directly inherit from JDBC 4 classes. For example, a proprietary ProprietaryXml class is still required to be returned under JRE 5.0 and thus cannot directly implement the standard java.sql.SQLXML class. Therefore, the following code does not work:

```
public class ProprietaryXml implements java.sql.SQLXML
{
}
```

In this situation (where a proprietary class that is previously supported and now standardized in the upper-level AOR), the version switch module 214 is not suitable. Therefore, class split module 216 can be implemented. The class split module 216 returns the proprietary class (which does not inherit from a JDBC 4 class) under JRE 5.0 but a JDBC 4 class under JRE 6.0. The class split module 216 returns the proprietary non-JDBC 4 class only under JRE 5.0. A new class, JDBC4Xml, which is a subclass of both the standard java.sql.SQLXML and the proprietary ProprietaryXml, is then returned under JRE 6.0. For example, the following code shows the class hierarchy for the new JDBC 4 class, JDBC4X, which inherits from the proprietary class ProprietaryXml and implements the new standard JDBC 4 class, java.sql.SQLXML.

```
public class ProprietaryXml
{
}
public class JDBC4Xml extends ProprietaryXml and
implements java.sql.SQLXML
{
}
```

In the current example there instantiation of JDBC 4 classes are not allowed in any existing classes loaded under JRE 5.0. For example, the following code will not work if loaded under JRE 5.0 because the JDBC 4 subclass JDBC4Xml is instantiated inside Connection.

```
public class Connection
{
    public java.sql.SQLXML createSQLXML (byte[ ] xmlBytes)
    {
        return new JDBC4Xml (xmlBytes);
    }
}
```

Therefore, the instantiation delegation module 220 can be implemented. The instantiation delegation module 220 delegates the instantiation to another factory class away from existing classes. For example the following code shows that instead of creating a new instance of the JDBC 4 subclass, JDBC4XML, directly in Connection, the instantiation is redirected to another class, JDBC4Factory.

```
public class Connection
{
    public java.sql.SQLXML createSQLXML ( )
    {
        return JDBC4Factory.createXml (xmlBytes);
    }
}
public class JDBC4Factory
{
    public static JDBC4Xml createXml (byte[ ] xml)
    {
        return new JDBC4Xml (xml);
    }
}
```

The code in the above example has one more compatibility issue. In any existing classes loaded under JRE 5.0, it is not allowed to return data from methods that return JDBC 4 classes. Therefore, the above code still does not work if invoked by Connection under JRE 5.0 because JDBC4Factory.createXml returns the JDBC 4 subclass JDBC4Xml. To resolve this issue, the upcast return module 218 can be implemented. The upcast return module 218 upcasts the return type in a new version class to the most generic type in the declaration and then downcasts the return type to the specific method during invocation. This is shown in the following code segment:

```
public class Connection
{
    public java.sql.SQLXML createSQLXML ( )
    {
        return (java.sql.SQLXML) JDBC4Factory.createXml (xmlBytes);
    }
}
public class JDBC4Factory
{
    public static Object createXml (byte[ ] xml)
    {
        return new com.ibm.db2.jcc.JDBC4Xml (xml);
    }
}
```

As shown in the above code segment, the return type of createXml in JDBC4Factory is first upcast to the most generic type Object in the declaration and then downcast to the specific java.sql.SQLXML type during invocation.

In addition, JDBC 4 exceptions are not allowed to be thrown in any existing classes loaded under JRE 5.0. For example, the following code does not work if loaded under JRE 5.0 because setClientInfo throws a JDBC 4 SQLClientInfoException in Connection.

```
public class Connection
{
    public void setClientInfo (String name, String value)
        throws SQLClientInfoException
    {
        throw new SQLClientInfoException( );
    }
}
```

Therefore, in one embodiment of the present invention, a combination of two or more of the version switch module 214, class split module 216, instantiation delegation module 220, and upcast module 218 can be used to resolve this issue. In the current example a combination of the version switch 214, class split 216, and instantiation delegation modules 220 are used to overcome the problem of setClientInfo throwing a JDBC 4 SQLClientInfoException in Connection as follows:

```
public class JDBC4Connection extends Connection
{
    public void setClientInfo (String name, String value)
        throws SQLClientInfoException
    {
        throw new SQLClientInfoException( );
    }
}
public class JDBC4Factory
{
    public static Connection createConnection ( )
    {
        return new JDBC4Connection ( );
    }
}
public class Connection
{
    public static Connection createConnection ( )
    {
        if (!runningJRE6_)
            return new Connection ( );
        else
            return JDBC4Factory.createConnection ( );
    }
}
```

The above code segment shows that JDBC4Connection is split from Connection to contain method setClientInfo, which throws a JDBC 4 SQLClientInfoException. Then, instantiation of JDBC4Connection is delegated to JDBC4Factory away from Connection, when loaded under JRE 5.0. Finally, an appropriate class is created from createConnection in Connection based on the running version of JRE.

As can be seen from the above discussion, the version switch module 214, class split module 216, instantiation delegation module 220, and upcast return module 218, enable a software module such as a database driver implemented with new versions classes/methods such as JDBC 4 support to be compiled under an older version of an AOE such as JRE 5.0 and to be run under both the older version AOE such as JRE 5.0 and the newer version AOE such as JRE 6.0. Therefore, one embodiment of the present invention avoids dual stream processing with duplicate development, service, and testing effort. Another advantage of the present invention is that mixed byte-code software modules (e.g., JAR files), which are inadequate and insufficient for supporting multiple connectivity types are avoided.

Example of an Information Processing System

Figure 3:
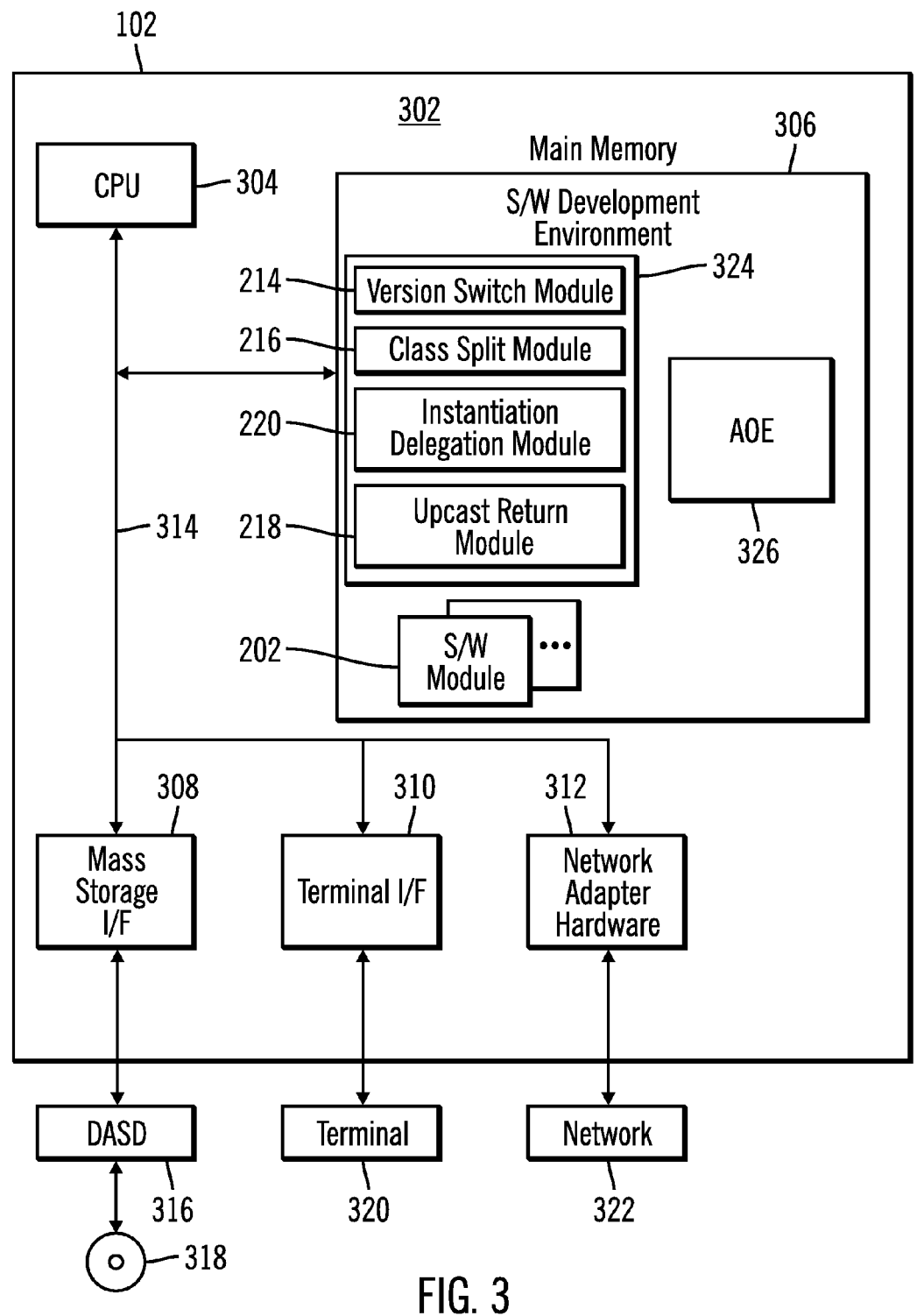
FIG. 3 is a block diagram illustrating an example of an information processing system environment according to an embodiment of the present invention.

FIG. 3 is a block diagram illustrating a more detailed view of an information processing system 102 according to an embodiment of the present invention. The information processing system is based upon a suitably configured processing system adapted to implement the example embodiment of the present invention. Any suitably configured processing system is similarly able to be used as the information processing system 102 by various embodiments of the present invention such as an information processing system residing in the computing environment of FIG. 1, a personal computer, workstation, or the like.

The information processing system 102 includes a computer 302. The computer 302 has a processor 304 that is connected to a main memory 306, mass storage interface 308, terminal interface 310, and network adapter hardware 312. A system bus 314 interconnects these system components. The mass storage interface 308 is used to connect mass storage devices, such as data storage device 316, to the information processing system 102. One specific type of data storage device is a computer readable medium such as a floppy disk drive, which may be used to store data to and read data from a CD 318 or a floppy diskette (not shown). Another type of data storage device is a data storage device configured to support, for example, NTFS type file system operations.

The main memory 306, in one embodiment, comprises the software development environment/tool 324 and/or an AOE 326. The software development environment 324 enables a user or automated program to develop software modules 202 for operation within the AOE 326 In one embodiment, the software modules 202 are developed using one or more of the version switch module 214, class split module 216, instantiation delegation module 220, and upcast return module 218 so that they can execute and perform across multiple versions of the AOE 226. The function of each of the version switch module 214, class split module 216, instantiation delegation module 220, and upcast return module 218 has been discussed in greater detail above.

Although illustrated as concurrently resident in the main memory 306, it is clear that respective components of the main memory 306 are not required to be completely resident in the main memory 306 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the information processing system 102.

Although only one CPU 304 is illustrated for computer 302, computer systems with multiple CPUs can be used equally effectively. Various embodiments of the present invention further incorporate interfaces that each includes separate, fully programmed microprocessors that are used to off-load processing from the CPU 304. Terminal interface 310 is used to directly connect one or more terminals 320 to computer 302 to provide a user interface to the computer 302. These terminals 320, which are able to be non-intelligent or fully programmable workstations, are used to allow system administrators and users to communicate with the information processing system 102. The terminal 320 is also able to consist of user interface and peripheral devices that are connected to computer 302 and controlled by terminal interface hardware included in the terminal I/F 310 that includes video adapters and interfaces for keyboards, pointing devices, and other devices/interfaces.

An operating system (not shown) included in the main memory is a suitable multitasking operating system such as the Linux, UNIX, Windows XP, and Windows Server 2001 operating system. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 102. The network adapter hardware 312 is used to provide an interface to a network 322. Various embodiments of the present invention are able to be adapted to work with any data communications connections including present day analog and/or digital techniques or via a future networking mechanism.

Although the example embodiments of the present invention are described in the context of a fully functional computer system, those of ordinary skill in the art will appreciate that various embodiments are capable of being distributed as a program product via CD or DVD, e.g. CD 318, CD ROM, or other form of recordable media, or via any type of electronic transmission mechanism.

Figure 4:
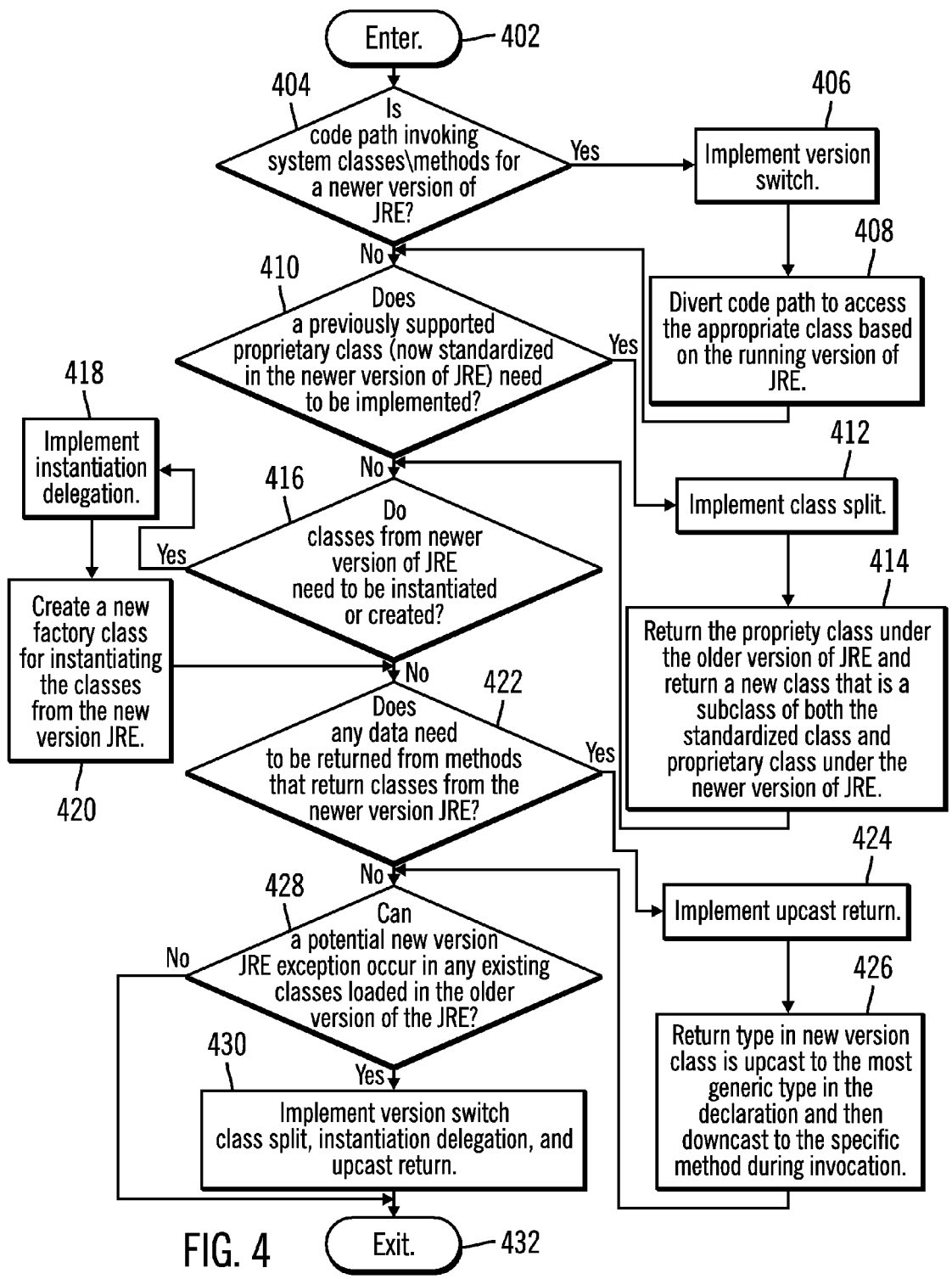
FIG. 4 is an operational flow diagram illustrating a process of providing a software module with a single stream process comprising multi-version support of an Application Operating Environment according to an embodiment of the present invention.

Example Process for Providing a Software Module with a Single Stream Process Comprising Multi-Version Support of an Application Operating Environment FIG. 4 is an operational flow diagram illustrating one example of providing a software module with a single stream process comprising multi-version support of an AOE according to one embodiment of the present invention. The operational flow diagram of FIG. 4 begins at step 402 and flows directly to step 404. It should be noted that the following process can be performed by a user (using a software development tool/environment) and/or an automated module such as the version coordination manager 212 to implement the techniques disclosed in the various embodiments of the present invention to provide multi-version support of a software module.

The version coordination manager 212, at step 404, determines if a code path is invoking system classes and/or methods for a newer version of JRE. If the result of this determination is positive, the version coordination manager 212, at step 406, implements the version switch module 214. The version switch module 214, at step 408, diverts the code path so that it accesses the appropriate class based on the running version of the JRE. The control flows to step 410. If the result of the determination is negative, the version coordination manager 212, at step 410, determines if a previously supported proprietary class (that is now standardized in the newer version of the JRE) needs to be implemented. If the result of this determination is positive, the version coordination manager 212, at step 412, implements the class split module 216. The class split module 216, at step 414, returns the proprietary class under the older version of JRE and returns a new class that is a subclass of both the standardized class and the proprietary class under the newer versions of the JRE.

The control flows to step 416. The version coordination manager 212, at step 416 determines if classes form the newer version JRE need to be instantiated. If the result of this determination is positive, the version coordination manager 212, at step 418, implements the instantiation delegation module 220. The instantiation delegation module 220, at step 420, creates a new factory class for instantiating the classes from the newer version JRE. The control flows to step 422. If the result of this determination is negative, the version coordination manager 212, at step 422, determines if any data needs to be returned from methods that return classes from the newer version of the JRE. If the result of this determination is positive, the version coordination manager 212, at step 424, implements the upcast return module 218.

The upcast return module 216, at step 426, upcasts the return type in the new version class to the most generic type in the declaration. The upcast return module then downcasts the return type to the specific method during invocation. The control flows to step 428. If the result of this determination is negative, the version coordination manager 212, at step 428, determines if a potential new version JRE exception can occur in any existing classes loaded in the older version of the JRE. If the result of this determination is negative, the control flow exits at step 432. If the result of this determination is positive, the version coordination manager 212, at step 430, implements two or more of the version switch module 214, class split module 216, instantiation delegation module 220, and upcast return module 218. The control flow then exits at step 432.

Non-Limiting Examples

The present invention can be realized in hardware, software, or a combination of hardware and software. A system according to one embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, performed with at least one processor, for developing a software module comprising support for multiple versions of an operating environment, the method comprising:
   determining a first set of references associated with a first version of an application operating environment;
   determining a second set of references associated with a second version of the application operating environment that is different from the first;
   associating a first class loader with the first version of the application operating environment;
   associating a second class loader with the second version of the application operating environment;
   encapsulating the first set of references, the second set of references, the first class loader, and the second class loader in a software module, wherein the second set of references are obscured from the first class loader; and
   providing at least one code base within the software module, wherein the at least one code base is compatible under both the first version of the application operating environment and the second version of the application operating environment.

2. The method of claim 1, wherein the first set of references are at least one of a set of classes and a set of methods associated with the first version of the application operating environment.

3. The method of claim 1, wherein the second set of references is at least one of a set of classes and a set of methods associated with the second version of the application operating environment.

4. The method of claim 1, wherein the application operating environment is an object oriented application operating environment.

5. The method of claim 4, wherein the object oriented application operating environment is a Java Runtime Environment.

6. A method of providing multi-version operating environment support for a software module, comprising:
   Determining, with at least one processor, that a software module is designed to be executed under at least a first and second versions of an application operating environment, the second being different from the first;
   selecting a set of references from a plurality of references associated with the at least first and second versions of the application operating environment, wherein the selected set of references is associated with the first version of the application operating environment, and wherein the selected set of references is based on a determination that the software module is being executed under the first version of the application operating environment;
   enabling, in response to the selecting, an executable version of the software module for execution under the first version of the application operating environment through a single code path associated with the at least first and second versions of the application operating environment;
   determining that the code path is invoking a newer version of the application operating environment; and
   diverting the code path so that it selects a set of classes associated with the newer version of the application operating environment.

7. The method of claim 6, wherein the application operating environment is an object oriented operating environment.

8. The method of claim 7, wherein the object orient operating environment is a Java Runtime Environment.

9. The method of claim 6, wherein the set of references include at least classes and methods associated with the first version of the application operating environment.

10. The method of claim 6, further comprising:
    determining that a proprietary class previously supported in an older version of the application operating environment that is now a standard class in a newer version of the application is required to be implemented;
    returning the proprietary class under the older version of the application operating environment; and returning a new class under the newer version of the application, wherein the new class is a subclass of both the proprietary class and the standard class.

11. The method of claim 6, further comprising:
determining that classes from a newer version of the application operating environment need to be instantiated; and
creating a new factory class for instantiating the class from the newer version of the application operating environment.

12. The method of claim 6, further comprising:
determining that data needs to be returned from at least one method that returns at least one class from a newer version of the application operating environment;
upcasting the a return type in the class to a highest level generic type in a declaration for the method; and
downcasting the return type to the at least one method during invocation of the method.

13. An information processing system providing multi-version operating environment support for a software module, the information processing system comprising:
a memory;
a processor; and
an application operating environment for executing an application, wherein the application operating environment includes at least a version coordination manager, wherein the version coordination manager being adapted to:
determine that a software module is designed to be executed under at least a first and second versions of an application operating environment, the second being different from the first;
select a set of references from a plurality of references associated with the at least first and second versions of the application operating environment, wherein the selected set of references is associated with the first version of the application operating environment, and wherein the selected set of references is based on a determination that the software module is being executed under the first version of the application operating environment;
enable, in response to selecting the set of references, an executable version of the software module for execution under the first version of the application operating environment through a single code path associated with the at least first and second versions of the application operating environment;
determine that the code path is invoking a newer version of the application operating environment; and
divert the code path so that it selects a set of classes associated with the newer version of the application operating environment.

14. The information processing system of claim 13, wherein the application operating environment is an object oriented operating environment.

15. The information processing system of claim 13, wherein the set of references includes at least classes and methods associated with the first version of the application operating environment.

16. The information processing system of claim 13, wherein the version coordination manager is further adapted to:
determine that a proprietary class previously supported in an older version of the application operating environment that is now a standard class in a newer version of the application is required to be implemented;
return the proprietary class under the older version of the application operating environment; and
return a new class under the newer version of the application, wherein the new class is a subclass of both the proprietary class and the standard class.

17. The information processing system of claim 13, wherein the version coordination manager is further adapted to:
determine that classes from a newer version of the application operating environment need to be instantiated; and
create a new factory class for instantiating the class from the newer version of the application operating environment.

* * * * *